(12) United States Patent
Huang

(10) Patent No.: US 9,954,440 B2
(45) Date of Patent: Apr. 24, 2018

(54) CONTROLLER FOR DC/DC POWER CONVERTERS

(71) Applicant: MediaTek Inc., Hsin-Chu (TW)

(72) Inventor: HuaChiang Huang, Taoyuan (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 15/229,541

(22) Filed: Aug. 5, 2016

(65) Prior Publication Data

US 2017/0331373 A1  Nov. 16, 2017

Related U.S. Application Data

(60) Provisional application No. 62/336,165, filed on May 13, 2016.

(51) Int. Cl.
| | | |
|---|---|---|
| H02M 3/156 | (2006.01) | |
| H02M 3/158 | (2006.01) | |
| H02M 1/00 | (2006.01) | |
| H02M 1/08 | (2006.01) | |

(52) U.S. Cl.
CPC ............. *H02M 3/158* (2013.01); *H02M 1/08* (2013.01); *H02M 2001/0009* (2013.01)

(58) Field of Classification Search
CPC .............. H02M 3/156; H02M 3/158; H02M 2003/1566; H02M 2001/0009; H02M 3/1588

See application file for complete search history.

(56) References Cited

U.S. PATENT DOCUMENTS

| | | | |
|---|---|---|---|
| 5,912,552 A | 6/1999 | Tateishi | |
| 6,057,675 A | 5/2000 | Tateishi | |
| 6,456,511 B1 | 9/2002 | Wong | |
| 7,453,250 B2 | 11/2008 | Qiu et al. | |
| 7,888,923 B2 | 2/2011 | Sahu | |
| 8,395,367 B2 * | 3/2013 | Chien | H02M 3/1588 323/288 |
| 9,154,031 B2 * | 10/2015 | Weng | H02M 3/156 |

(Continued)

FOREIGN PATENT DOCUMENTS

| | | |
|---|---|---|
| TW | 2005-15114 A | 5/2005 |
| TW | 2009/47823 A | 11/2009 |

OTHER PUBLICATIONS

Li et al., "Modeling of V2 Current-Mode Control," Applied Power Electronics Conference and Exposition, Feb. 2009, pp. 298-304, IEEE.

*Primary Examiner* — Timothy J Dole
*Assistant Examiner* — Sisay G Tiku
(74) *Attorney, Agent, or Firm* — Wolf, Greenfield & Sacks, P.C.

(57) ABSTRACT

According to at least one aspect, a circuit for controlling a power converter including an inductor having a terminal coupled to a supply voltage by a switch is provided. The circuit includes a detector configured to detect voltage transient events in an output voltage of the power converter and generate a control signal based on the detected voltage transient events and a control signal generator configured to receive the control signal and control operation of the switch based on the control signal at least in part by varying an on-time of the switch during the voltage transient events and holding the on-time of the switch constant when no transient event is detected by the detector.

23 Claims, 7 Drawing Sheets

(56) References Cited

U.S. PATENT DOCUMENTS

| | | | | |
|---|---|---|---|---|
| 9,653,992 B2* | 5/2017 | Yuan | .................... | H02M 3/156 |
| 2010/0301827 A1* | 12/2010 | Chen | .................... | H02M 3/156 |
| | | | | 323/299 |
| 2013/0099761 A1* | 4/2013 | Dong | .................... | H02M 3/156 |
| | | | | 323/271 |
| 2013/0314060 A1* | 11/2013 | Chen | ........................ | G05F 1/46 |
| | | | | 323/234 |
| 2014/0340059 A1* | 11/2014 | Chen | .................... | H02M 3/156 |
| | | | | 323/271 |
| 2015/0077080 A1* | 3/2015 | Chen | .................... | H02M 3/156 |
| | | | | 323/282 |
| 2015/0077083 A1* | 3/2015 | Chen | .................... | H02M 3/156 |
| | | | | 323/288 |
| 2015/0200592 A1* | 7/2015 | Chang | .................. | H02M 3/156 |
| | | | | 323/271 |
| 2015/0244262 A1* | 8/2015 | Ouyang | ................ | H02M 3/158 |
| | | | | 323/283 |
| 2016/0013778 A1* | 1/2016 | Li | ........................... | H03K 7/08 |
| | | | | 323/288 |
| 2016/0301307 A1* | 10/2016 | Huang | ................. | H02M 3/156 |
| 2017/0025952 A1* | 1/2017 | Huang | ................. | H02M 3/156 |
| 2017/0077812 A1* | 3/2017 | Guo | ..................... | H02M 3/158 |

\* cited by examiner

CONTROLLER FOR DC/DC POWER CONVERTERS

CROSS-REFERENCE TO RELATED APPLICATIONS

This application claims priority to U.S. provisional application Ser. No. 62/336,165 titled "ROBUST CONSTANT ON-TIME CONTROLLER," filed May 13, 2016, which is hereby incorporated herein by reference in its entirety.

BACKGROUND

1. Technical Field

The techniques described herein relate to techniques to improve the performance of power converters, such as buck converters, during transient events.

2. Discussion of the Related Art

Power converters are used for converting electrical energy from one form to another. A buck converter is a type of power converter that produces a lower output voltage than its input voltage. A constant on-time buck converter is a buck converter that repeatedly switches its high-side switch on for a constant on-time to achieve a desired output voltage.

SUMMARY

According to at least one aspect, a circuit for controlling a power converter including an inductor having an inductor current is provided. The circuit includes a detector configured to detect voltage transients in an output voltage of the power converter and generate a first control signal based on the detected voltage transients in the output voltage, a ramp generator configured to receive an input signal and generate a ramp signal based on the input signal, a comparator including a first input to receive the ramp signal, a second input to receive the first control signal, and an output to provide a second control signal, a pulse generator configured to receive the first control signal and the second control signal, generate a pulse signal including a pulse, and vary at least one characteristic of the pulse based on the first control signal and the second control signal, and a control logic circuit configured to receive the pulse signal and control operation of at least one switch in the power converter based on the pulse signal.

In one embodiment, the input signal to the ramp generator is a voltage at a terminal of the inductor and wherein the ramp generator includes a low-pass filter configured to generate the ramp signal by filtering the voltage at the terminal of the inductor. In one embodiment, the input signal to the ramp generator is a magnitude of the inductor current and wherein the ramp generator includes an amplifier coupled in series with a sample and hold circuit. In one embodiment, the ramp generator is further configured to receive the pulse signal and control the sample and hold circuit based on the pulse signal.

In one embodiment, the ramp generator includes a capacitor, a switch coupled in parallel with the capacitor, a voltage source coupled to a first terminal of the capacitor, and a current source coupled to a second terminal of the capacitor. In this embodiment, the input signal to the ramp generator may be the pulse signal and the ramp generator may be further configured to control operation of the switch based on the pulse signal.

In one embodiment, the pulse generator includes a memory configured to generate the pulse signal by switching between at least two states. In this embodiment, the pulse generator may further include a current source, a capacitor coupled in series with the current source, and a switch having a first terminal coupled between the current source and the capacitor and a second terminal coupled to a reference potential. The pulse generator may further include a comparator having a first input coupled to the first terminal of the switch and a second input configured to receive the first control signal. The memory in the pulse generator may be, for example, an SR latch including a set terminal configured to receive the second control signal and a reset terminal coupled to an output of the comparator included in the pulse generator. The SR latch may be further configured to generate an inverted version of the pulse signal and the pulse generator may be further configured to control operation of the switch based on the inverted version of the pulse signal.

In one embodiment, the pulse generator is further configured to vary a width of the pulse based on the first control signal and the second control signal.

According to at least one aspect, a power converter is provided. The power converter includes an inductor having a first terminal and a second terminal, the second terminal being configured to provide an output voltage of the power converter, a first switch having a control terminal, a first terminal coupled to the first terminal of the inductor, and a second terminal configured to receive an input voltage of the power converter, a detector configured to detect voltage transients in the output voltage of the power converter and generate a first control signal based on the detected voltage transients in the output voltage, a ramp generator configured to receive an input signal and generate a ramp signal based on the input signal, a comparator including a first input configured to receive the ramp signal, a second input configured to receive the first control signal, and an output configured to provide a second control signal, a pulse generator configured to receive the first control signal and the second control signal, generate a pulse signal including a pulse, and vary at least one characteristic of the pulse based on the first control signal and the second control signal, and a control logic circuit coupled to the control terminal of the first switch, the control logic circuit being configured to receive the pulse signal and control operation of the first switch based on the pulse signal.

In one embodiment, the power converter further includes a second switch coupled in series with the first switch and wherein the control logic is further configured to control operation of the first and second switches based on the pulse signal.

In one embodiment, the input signal to the ramp generator is a voltage at the first terminal of the inductor and wherein the ramp generator includes a low-pass filter configured to generate the ramp signal by filtering the voltage at the first terminal of the inductor. In one embodiment, the input signal to the ramp generator is a magnitude of current in the inductor and wherein the ramp generator includes an amplifier coupled in series with a sample and hold circuit.

In one embodiment, the ramp generator includes a capacitor, a switch coupled in parallel with the capacitor, a voltage source coupled to a first terminal of the capacitor, and a current source coupled to a second terminal of the capacitor. In this embodiment, the input signal to the ramp generator may be the pulse signal and the ramp generator may be further configured to control operation of the switch coupled in parallel with the capacitor based on the pulse signal.

In one embodiment, the pulse generator is further configured to vary a width of the pulse based on the first control signal and the second control signal.

According to at least one aspect, a circuit for controlling a power converter including an inductor having a terminal coupled to a supply voltage by a switch is provide. The circuit includes a detector configured to detect voltage transient events in an output voltage of the power converter and generate a first control signal based on the detected voltage transient events and a control signal generator configured to receive the first control signal and control operation of the switch based on the first control signal at least in part by varying an on-time of the switch during the voltage transient events and holding the on-time of the switch constant when no transient event is detected by the detector.

In one embodiment, the control signal generator includes a ramp generator configured generate a ramp signal and a comparator configured to compare the ramp signal with the first control signal to generate a second control signal. In one embodiment, the ramp generator is further configured to generate the ramp signal based on at least one of a magnitude of current in the inductor and a voltage at a terminal of the inductor. In one embodiment, the control signal generator further includes a pulse generator configured to receive the first and second control signals and generate a pulse signal including a pulse based on the first and second control signals and wherein the control signal generator is further configured to control operation of the switch based on the pulse signal. In one embodiment, the pulse generator is further configured to vary at least one characteristic of the pulse in the pulse signal based on the first and second control signals. In one embodiment, the ramp generator is further configured to receive the pulse signal and generate the ramp signal based on the pulse signal.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Conventional constant on-time buck converters generally provide a faster transient response time than alternative types of power converters, such as clock-based buck converters. However, conventional constant on-time buck converters may still be unable to keep up with fast load changes. The present inventors have appreciated that the performance of a constant on-time buck converter can be improved by varying the on-time of the high-side switch during transient events and returning to a constant on-time when the transient event ends.

Figure 1:
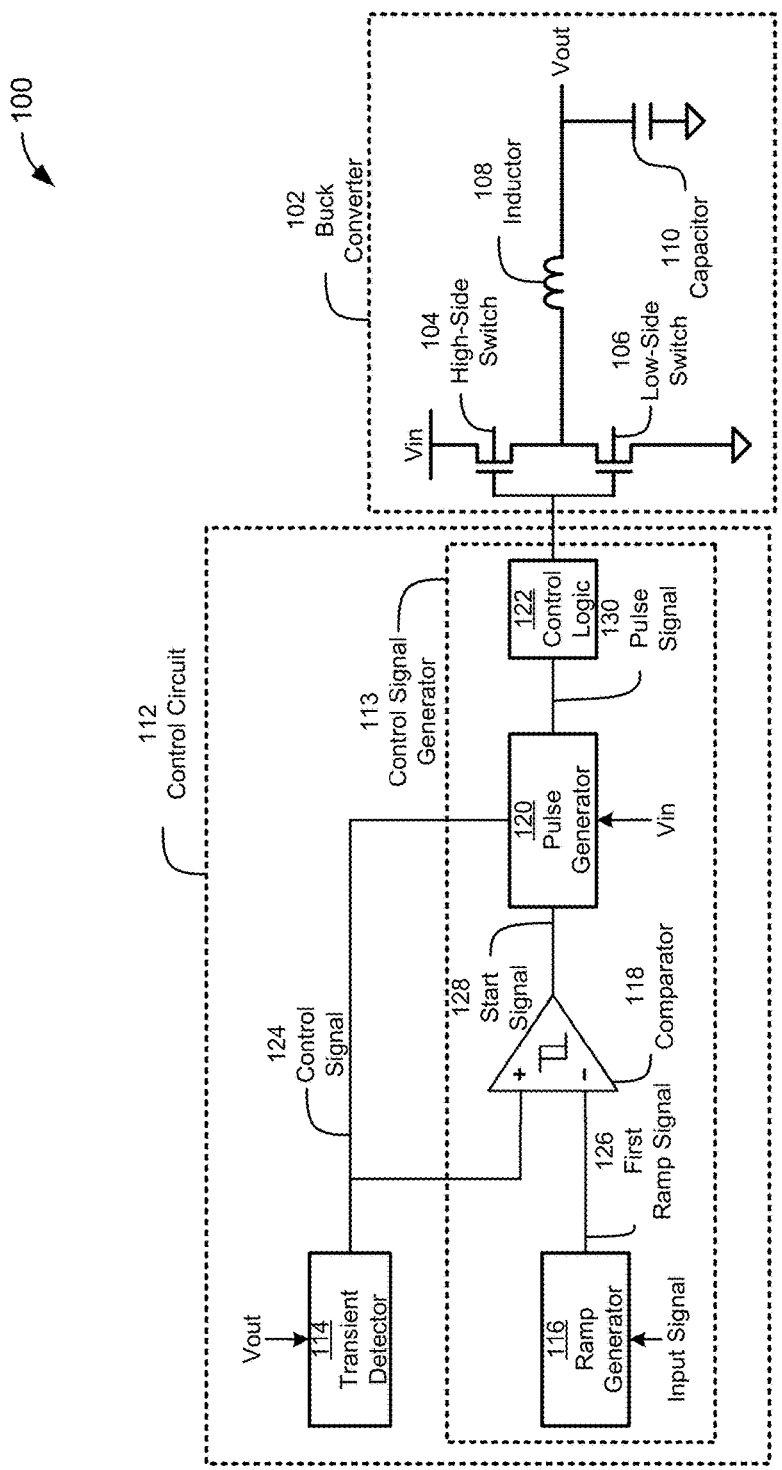
FIG. 1 shows a diagram of a power converter system, according to some embodiments.

FIG. 1 shows a diagram of a power converter system 100 that varies the on-time of the high-side switch during transient events, according to some embodiments. The power converter system 100 includes control circuit 112 coupled to a buck converter 102. The buck converter 102 receives an input voltage $V_{in}$ and provides an output voltage $V_{out}$ that is smaller than the input voltage $V_{in}$. The buck converter 102 includes a high-side switch 104, a low-side switch 106, an inductor 108, and a capacitor 110. The capacitor 110 includes a first terminal coupled to a first terminal of the inductor 108 and a second terminal coupled to a reference potential (e.g., ground). The high-side switch 104 includes a first terminal configured to receive the input voltage $V_{in}$, a second terminal coupled to a second terminal of the inductor 108, and a control terminal. The low-side switch 106 includes a first terminal coupled to the second terminal of the inductor 108, a second terminal coupled to the reference potential, and a control terminal. The control circuit 112 may couple to the control terminals of the high and low-side switches 104 and 106, respectively, to control a voltage applied to the second terminal of the inductor 108 and, thereby, control the output voltage $V_{out}$. For example, the control circuitry may alternative turning on and off the high- and low-side switches 104 and 106, respectively, to produce a square wave voltage at the second terminal of the inductor 108 with an average value that is lower than the input voltage $V_{in}$. In this example, the inductor 108 in combination with the capacitor 110 functions as a low-pass filter and, thereby, yields a DC output voltage $V_{out}$ that is a lower voltage than the input voltage $V_{in}$. The control circuit 112 includes a transient detector 114 and a control signal generator 113. The transient detector 114 receives the output voltage of the buck converter 102 and detects variations in the output voltage relative to a voltage reference. The transient detector 114 may generate a control signal based on the detected voltage transients and provide the control signal 124 to the control signal generator 113. The control signal generator 113 may be configured to receive the control signal 124 and control operation of the high-side switch 104 and/or the low-side switch 106 based on the control signal 124. For example, the control signal generator 113 may vary an on-time of the high-side switch 104 during the voltage transient events and hold the on-time of the high-side switch 104 constant when no transient event is detected by the transient detector 114.

As shown in FIG. 1, the control signal generator 113 includes a ramp generator 116, a comparator 118, a pulse generator 120, and control logic 122. The ramp generator 116 generates a first ramp signal 126 based on an input signal. As discussed in more detail below, the input signal may be any one of various signals from the control circuit 112 and/or the buck converter 102. For example, the input signal may be a voltage at one end of the inductor 108 in the buck converter 102. The first ramp signal 126 is provided to an inverting terminal of the comparator 118. The non-inverting terminal of the comparator 118 receives the control signal 124 from the transient detector 114. The comparator 118 compares the first ramp signal 126 with the control signal 124 to generate an output signal indicative of whether the first ramp signal 126 is above (or below) the control signal 124. The output signal of the comparator 118 may be a start signal 128 that triggers the pulse generator 120 to start a pulse in pulse signal 130. For example, the first ramp signal 126 may include a decreasing ramp and the start signal 128 may trigger the pulse generator 120 to generate a pulse when the first ramp signal 126 falls below the control signal 124.

The pulse generator 120 generates the pulse signal 130 that directs the control logic 122 to control the state of the high and/or low-side switches 104 and 106, respectively. The pulse generator 120 may receive the control signal 124 from the transient detector 114 in addition to the start signal 128 from the comparator 118 and generate the pulse signal 130 based on the control signal 124 and the start signal 128. In some embodiments, the pulse signal 130 may include pulses indicative of when then high-side switch 104 should be turned on (or off). In these embodiments, the pulse generator 120 may vary one or more characteristics of the pulses in the pulse signal 130 to adjust the output voltage $V_{out}$ and, thereby, compensate for transient events. For example, the output voltage $V_{out}$ may be below the target voltage and the pulse signal 130 may indicate that the on-time of the high-side switch 104 should be increased to increase the average voltage at the second end of the inductor 108 and, thereby, increase the output voltage $V_{out}$. Conversely, the output voltage $V_{out}$ may be above the target voltage and the pulse signal 130 may indicate that the on-time of the high-side switch 104 should be decreased to decrease the average voltage at the second end of the inductor 108 and, thereby, reduce the output voltage $V_{out}$.

Figure 2A:
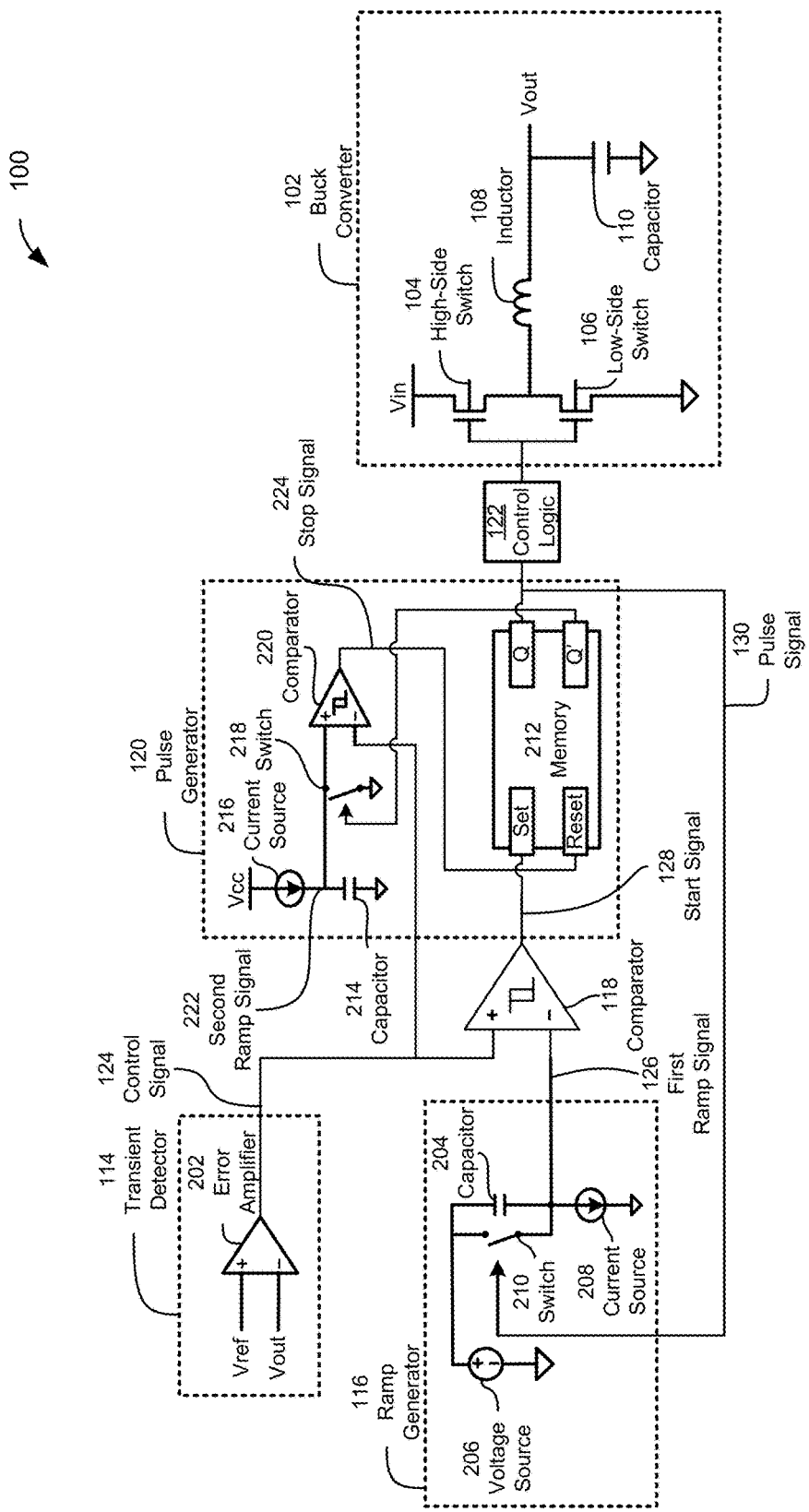
FIGS. 2A-2C each shows a detailed diagram of a buck converter system, according to some embodiments.

FIG. 2A shows an example implementation of a buck converter system, according to some embodiments. As shown, the transient detector 114 includes an error amplifier 202 with a non-inverting terminal to receive a voltage reference $V_{ref}$, an inverting terminal to receive the output voltage $V_{out}$, and an output to provide the control signal 124. In some embodiments, the voltage reference $V_{ref}$ is the target (or desired) output voltage $V_{out}$. In these embodiments, the control signal 124 generated by the error amplifier 202 is indicative of the difference between the desired output voltage $V_{ref}$ and the actual output voltage $V_{out}$.

The pulse generator 120 shown in FIG. 2A generates the pulse signal 130 based on the start signal 128 from the comparator 118 and the control signal 124 from the transient detector 114. The pulse generator 120 includes a memory 212 that generates the pulses in the pulse control signal 130 by switching between two states, such as a low state and a high state. The memory 212 may be, for example, an SR latch. The memory 212 provides the pulse signal 130 at an output Q and provides an inverted version of the pulse signal 130 at an output Q'. The memory 212 includes a set input coupled to the output of the comparator 118 to receive the start signal 128. The memory 212 may start a pulse in the pulse signal 130 responsive to the start signal 128 changing from a first state to a second state, such as from low to high. The memory 212 also includes a reset terminal to receive a stop signal 224. The memory 212 may stop a pulse in the pulse signal 130 responsive to the stop signal 224 changing from a first state to a second state, such as from high to low. The stop signal 224 may be generated by a comparator 220 that compares the control signal 124 with a second ramp signal 222. The second ramp signal 222 may be generated by charging and discharging a capacitor 214. For example, the capacitor 214 may start in a completely discharged state with a zero (or near zero) voltage across the terminals of the capacitor 214. A current source 216 in series with the capacitor 214 charges the capacitor 214 to increase the voltage across the terminals of the capacitor 214. Thereby, an increasing ramp signal is generated as the second ramp signal 222. A switch 218 is coupled in parallel with the capacitor 214 and discharges the capacitor 214 to reset the increasing ramp signal. The switch 218 may be controlled based on an inverted version of the pulse signal 130 provided by the memory 212.

As discussed above, the ramp generator 116 generates the first ramp signal 126 that is provided to the comparator 118. The ramp generator 116 in FIG. 2A includes a capacitor 204 coupled in parallel with a switch 210 that is controlled by the pulse signal 130 provided by the pulse generator 120. The ramp generator 116 further includes a voltage source 206 coupled to a first terminal the switch 210 and a current source 208 coupled to a second terminal of the switch 210. The ramp generator 116 as shown in FIG. 2A generates a decreasing ramp signal by charging and discharging the capacitor 204. For example, the capacitor 204 may start in a completely discharged state with the voltage at both terminals of the capacitor 204 equal to (or approximately equal to) the voltage provided by the voltage source 206. The current source 208 coupled in series with the capacitor 204 charges the capacitor 204 to increase the voltage across the terminals of the capacitor 204. Thereby, the voltage of the first ramp signal 126 decreases over time. The voltage of the first ramp signal 126 may be reset back to the initial value (e.g., the voltage of the voltage source 206) by temporarily closing the switch 210 to discharge the capacitor 204. As shown, the capacitor 204 may be discharged via switch 210 based on the state of the pulse signal 130. For example, the capacitor 204 may be discharged at the beginning of each pulse in the pulse signal 130.

Figure 2B:
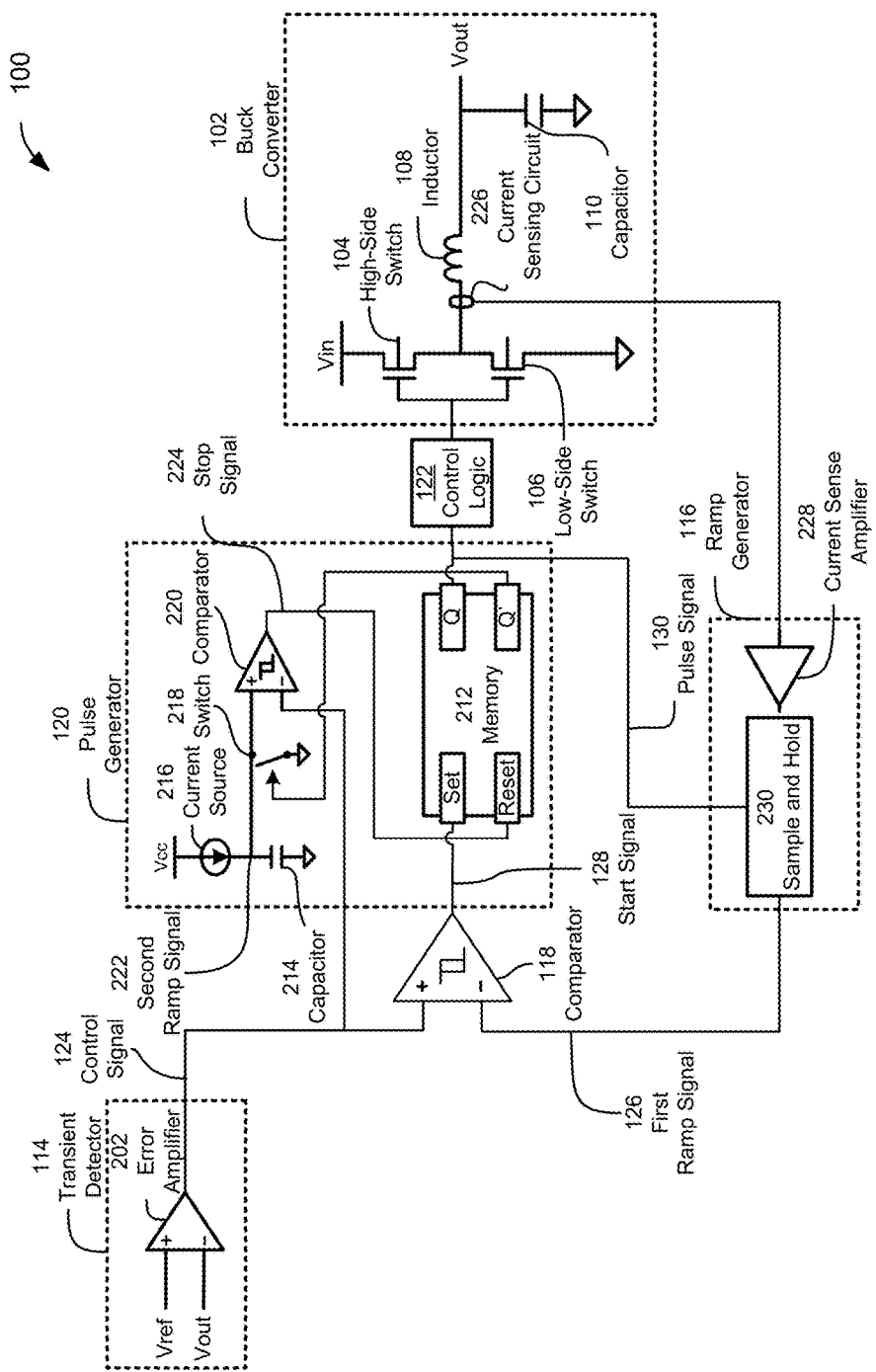

It should be appreciated that the ramp generator 116 shown in FIG. 2A may generate the first ramp signal 126 based on signals other than the pulse signal 130. The buck converter 102 and/or the control circuit 112 may include multiple signals that are suitable to transform into the first ramp signal 126. For example, the inductor current in the inductor 108 may have a triangular wave pattern including portions with an increasing slope and portions with a decreasing slope. A decreasing ramp signal may be formed by removing the portions of the triangular wave with an increasing slope to yield a signal with a series of decreasing ramps. Such an example ramp generator is shown in FIG. 2B. As illustrated, the buck converter 102 includes a current sensing circuit 226 that is configured to generate the inductor current signal indicative of a magnitude of current in the inductor 108 and provide the inductor current signal to the ramp generator 116. The ramp generator 116 amplifies the inductor current signal via a current sense amplifier 228 and removes the portions of the triangular waveform with an increasing slope via a sample and hold circuit 230. For example, the increasing sections of the triangular waveform may correspond to times when the high-side switch 104 is turned on and the decreasing sections of the triangular waveform may correspond to times when the high-side switch 104 is turned off. Thereby, the increasing sections of the triangular waveform can be removed by holding the inductor current signal at a constant level just before the high-side switch 104 is turned on. The sample and hold circuit 230 may receive the pulse signal 130 and hold the inductor current signal constant at the appropriate times based on the pulse signal 130. For example, the pulses in the pulse signal 130 may be indicative of when the high-side switch 104 is turned on. In this example, the sample and hold circuit 230 may hold the inductor current level constant during periods of time when the pulse signal 130 is high (indicating that the high-side switch 104 is turned on).

Figure 2C:
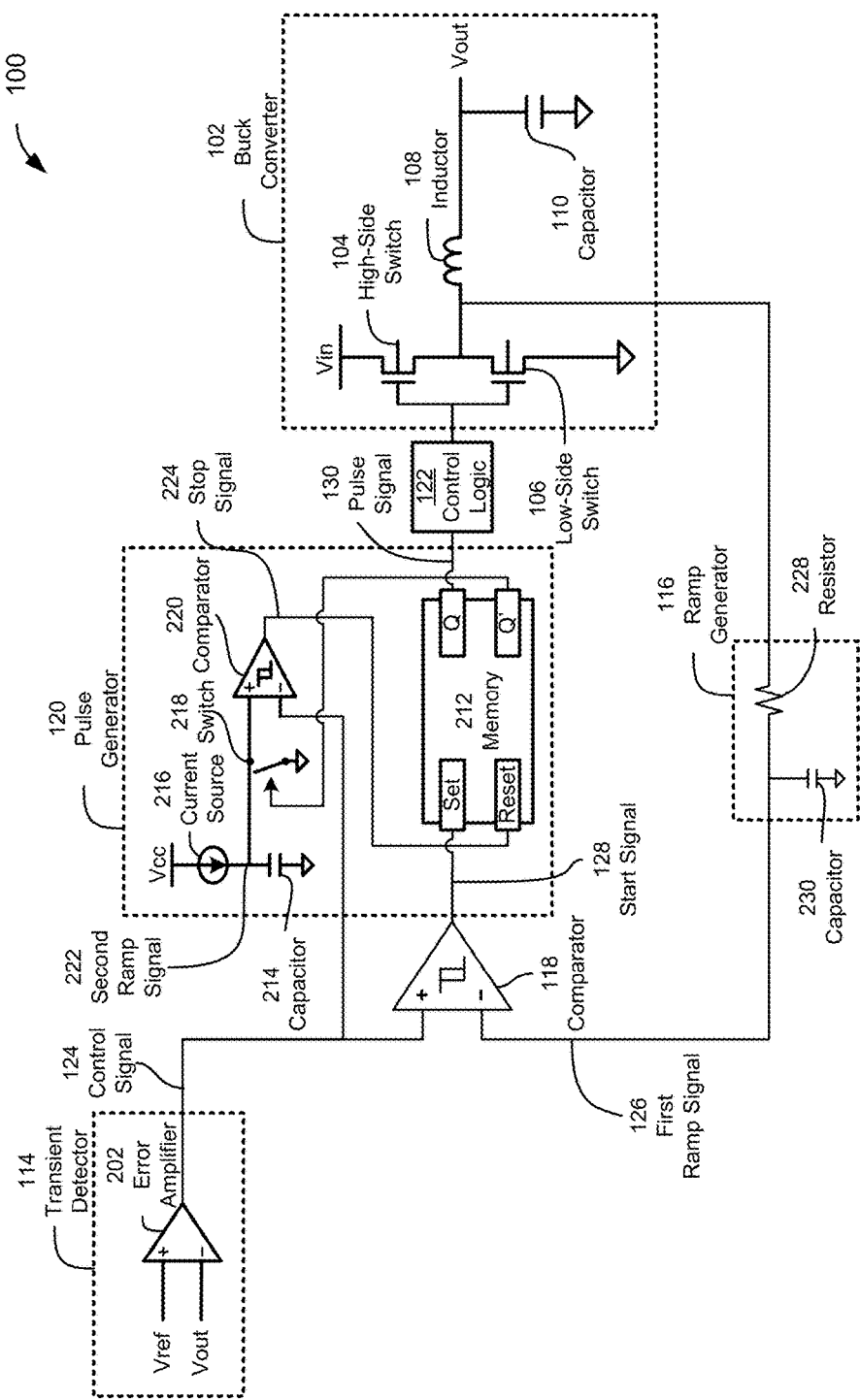

In some embodiments, the ramp generator 116 generates the first ramp signal 126 based on a voltage at one terminal of the inductor 108. For example, the voltage waveform at the terminal of the inductor 108 that is coupled to the high and low-side switches 104 and 106, respectively, may be a square wave. Thereby, a ramp signal may be formed by filtering the square wave to yield a triangular waveform including a series of decreasing ramps. Such an example ramp generator is shown in FIG. 2C. As shown, the ramp generator 116 receives the voltage at one terminal of the inductor 108 and applies a low-pass filter to the voltage waveform to generate the first ramp signal 126. The low-pass filter may be formed by the resistor 228 and the capacitor 230.

Figure 3A:
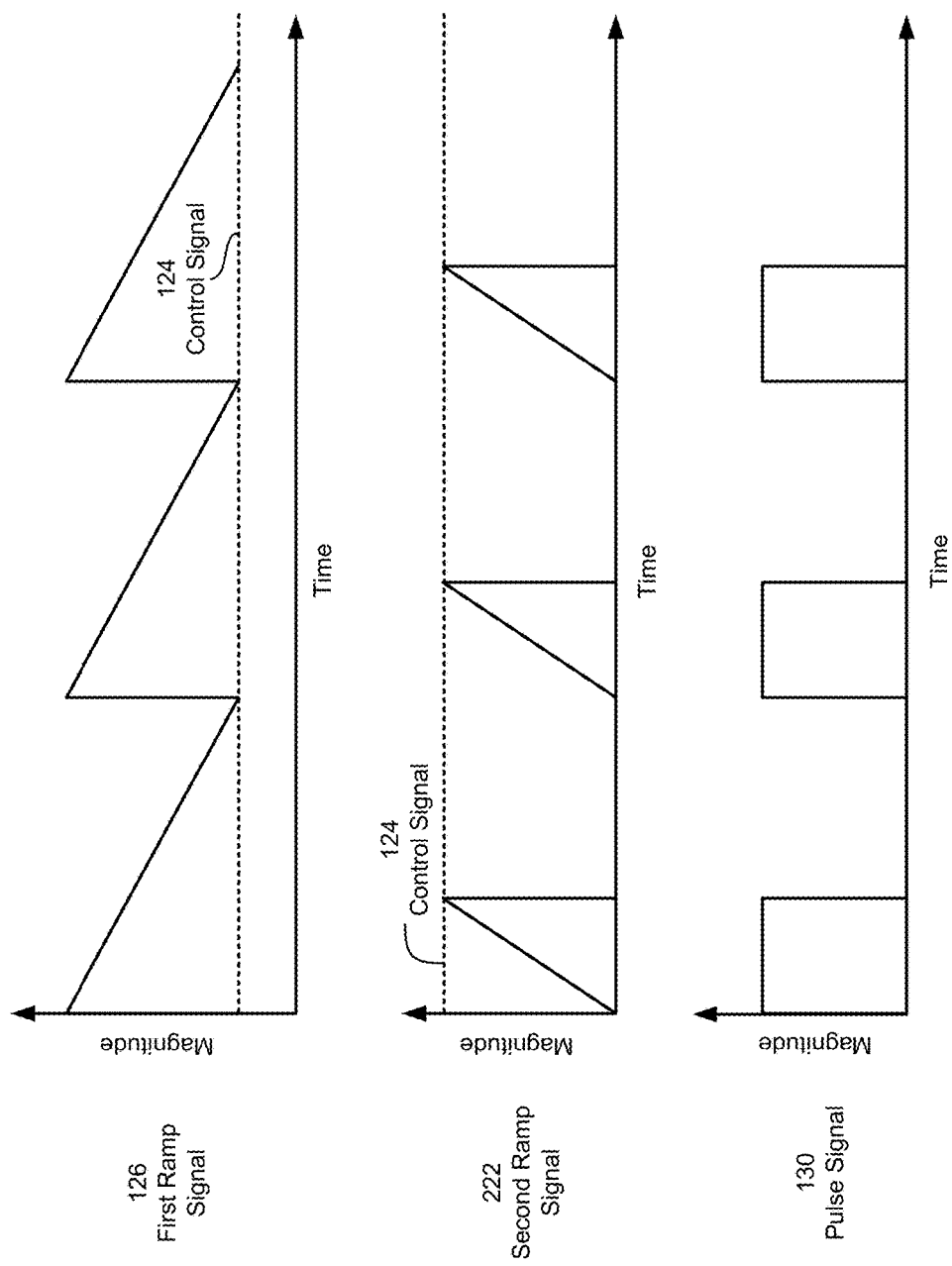
FIGS. 3A-3C show example waveforms of a pulse signal during different operating conditions, according to some embodiments.

As discussed above, the pulse generator 120 may vary one or more characteristics of the pulses in the pulse signal 130 during transient events to maintain the output voltage Vout. For example, the width and/or the timing of pulses in the pulse signal 130 may be changed. FIG. 3A shows an example waveform of the pulse signal 130 without any transient events. As shown, the pulse signal 130 includes a plurality of pulses with the same pulse width that are evenly spaced over time. Each pulse in the pulse signal 130 starts when the first ramp signal 126 reaches the control signal 124. The first ramp signal 126 also resets when the magnitude of the first ramp signal 126 reaches the control signal 124. Each pulse in the pulse signal 130 ends when the magnitude of the second ramp signal 222 reaches the control signal 124. The second ramp signal 222 resets when the control signal 124 is reached and remains low until a new pulse in the pulse signal 130 is started.

Figure 3B:
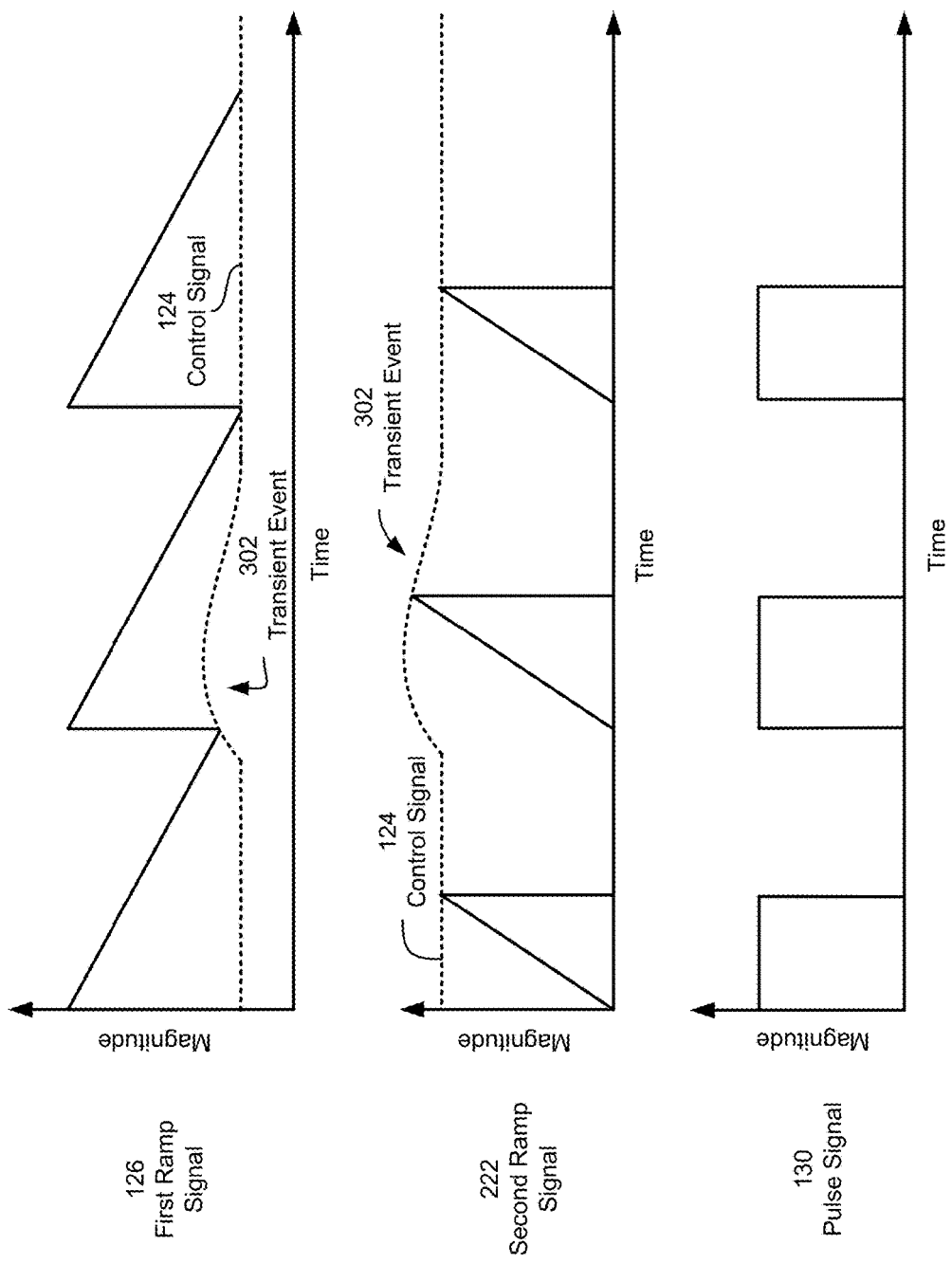

FIG. 3B shows an example waveform of the pulse signal 130 during a transient event where the output voltage $V_{out}$ has dropped. The drop in the output voltage $V_{out}$ may be caused by, for example, a change in the impedance of the load and/or a change in a magnitude of current drawn by the load. As shown, the transient event 302 is characterized by an increase in the control signal 124. The increase in the control signal 124 stops the first ramp in the first ramp signal 126 early and, thereby, starts the second pulse in the pulse signal 130 early. The duration of the second pulse in the pulse signal 130 is also increased because the second ramp signal 222 has to reach a now increased control signal 124. As shown, the third pulse returns to the same characteristics as the first pulse because the transient event 302 has ended.

Figure 3C:
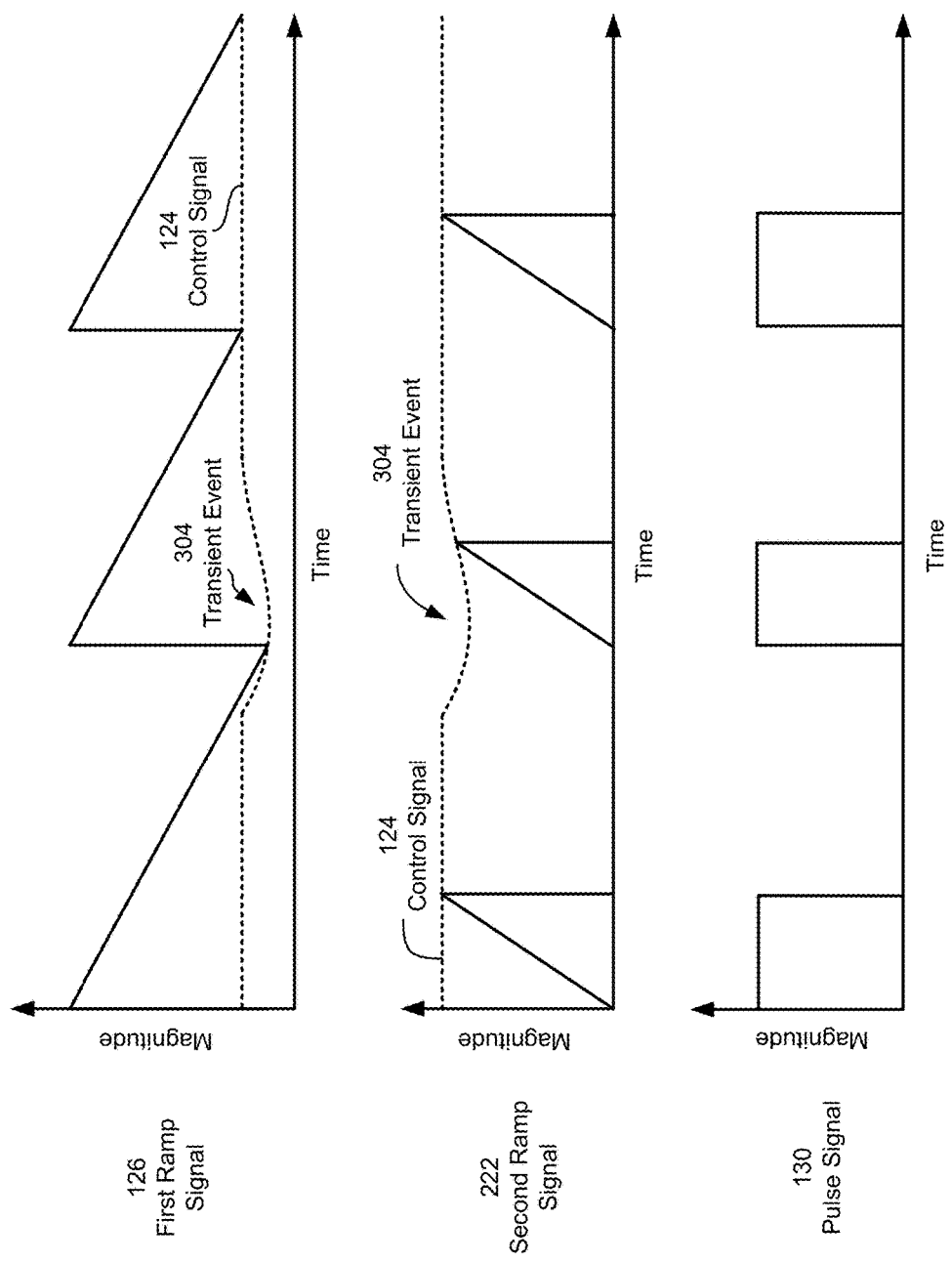

FIG. 3C shows an example waveform of the pulse signal 130 during a transient event where the output voltage $V_{out}$ has increased. The increase in the output voltage $V_{out}$ may be caused by, for example, a change in the impedance of the load and/or a change in a magnitude of current drawn by the load. As shown, the transient event 304 is characterized by a decrease in the control signal 124. The decrease in the control signal 124 lengthens the first ramp in the first ramp signal 126 and, thereby, delays the start of the second pulse in the pulse signal 130. The duration of the second pulse in the pulse signal 130 is also shortened because the second ramp signal 222 only has to reach a now decreased control signal 124. As shown, the third pulse returns to the same characteristics as the first pulse because the transient event 304 has ended.

In some embodiments, various parameters of the ramp generator 116 and/or the pulse generator 120 may be specifically selected to yield pulses in the pulse signal 130 with particular characteristics during steady-state operation. Referring to FIG. 2A for example, the voltage provided by the voltage source 206 ($V_{206}$) and the magnitude of current provided by the current source 216 ($I_{216}$) may be selected to yield pulses in the pulse signal 130 with a width that is proportional to $V_{ref}$ divided by the input voltage $V_{in}$. In this example, the magnitude of current provided by the current source 216 ($I_{216}$) may be selected to be proportional to the input voltage ($V_{in}$). In addition, the voltage provided by the voltage source 206 ($V_{206}$) may be a function of the voltage reference ($V_{ref}$), the capacitance of the capacitor 204 ($C_{204}$), the current drawn by the current source 208 ($I_{208}$), and the desired period (T) of the pulses in the pulse signal 130 at steady-state as shown in equation (1) below:

$$V_{206} = V_{ref} + \frac{I_{208} * T}{C_{204}} \quad (1)$$

It should be appreciated that different relationships may be employed to determine appropriate values for the components shown in FIGS. 2A-2C. Further, the pulses in the pulse signal 130 may not have a width proportional to $V_{ref}$ divided by the input voltage $V_{in}$ in some embodiments.

Above embodiments of buck converters have been described. The techniques described herein are not limited to constant on-time buck converters, as such techniques may be applied to constant off-time buck converters, for example. Further, the techniques described herein are not limited to buck converters, as such techniques may be applied to other types of power converters, such as boost converters, for example. In some embodiments, such techniques may be applied to constant on-time or constant off-time boost converters. Further, although the techniques described herein may be applied to constant on-time or constant-off time power converters, the techniques described herein are not limited to power converters having a constant on-time or off-time.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:
1. A circuit for controlling a power converter including an inductor having an inductor current, the circuit comprising:
a detector configured to detect voltage transients in an output voltage of the power converter and generate a first control signal based on the detected voltage transients in the output voltage;
a ramp generator configured to receive an input signal and generate a ramp signal based on the input signal;
a comparator including a first input to receive the ramp signal, a second input to receive the first control signal, and an output to provide a second control signal;
a pulse generator configured to receive the first control signal and the second control signal, generate a pulse signal including a pulse, and vary at least one charac- teristic of the pulse based on the first control signal and the second control signal, the pulse generator comprising a memory configured to generate the pulse signal by switching between at least two states, a current source, a capacitor coupled in series with the current source, and a switch having a first terminal coupled between the current source and the capacitor and a second terminal coupled to a reference potential; and a control logic circuit configured to receive the pulse signal and control operation of at least one switch in the power converter based on the pulse signal.

2. The circuit of claim 1, wherein the input signal to the ramp generator is a voltage at a terminal of the inductor and wherein the ramp generator includes a low-pass filter configured to generate the ramp signal by filtering the voltage at the terminal of the inductor.

3. The circuit of claim 1, wherein the input signal to the ramp generator is a magnitude of the inductor current and wherein the ramp generator includes an amplifier coupled in series with a sample and hold circuit.

4. The circuit of claim 1, wherein the ramp generator is further configured to receive the pulse signal and control the sample and hold circuit based on the pulse signal.

5. The circuit of claim 1, wherein the ramp generator includes a capacitor, a switch coupled in parallel with the capacitor, a voltage source coupled to a first terminal of the capacitor, and a current source coupled to a second terminal of the capacitor.

6. The circuit of claim 5, wherein the input signal to the ramp generator is the pulse signal and wherein the ramp generator is further configured to control operation of the switch based on the pulse signal.

7. The circuit of claim 1, wherein the pulse generator further includes a comparator having a first input coupled to the first terminal of the switch and a second input configured to receive the first control signal.

8. The circuit of claim 7, wherein the memory is an SR latch and includes a set terminal configured to receive the second control signal and a reset terminal coupled to an output of the comparator included in the pulse generator.

9. The circuit of claim 8, wherein the SR latch is further configured to generate an inverted version of the pulse signal and wherein the pulse generator is further configured to control operation of the switch based on the inverted version of the pulse signal.

10. The circuit of claim 1, wherein the pulse generator is further configured to vary a width of the pulse based on the first control signal and the second control signal.

11. A power converter comprising:
an inductor having a first terminal and a second terminal, the second terminal being configured to provide an output voltage of the power converter;
a first switch having a control terminal, a first terminal coupled to the first terminal of the inductor, and a second terminal configured to receive an input voltage of the power converter;
a detector configured to detect voltage transients in the output voltage of the power converter and generate a first control signal based on the detected voltage transients in the output voltage;
a ramp generator configured to receive an input signal and generate a ramp signal based on the input signal;
a comparator including a first input configured to receive the ramp signal, a second input configured to receive the first control signal, and an output configured to provide a second control signal;

a pulse generator configured to receive the first control signal and the second control signal, generate a pulse signal including a pulse, and vary at least one characteristic of the pulse based on the first control signal and the second control signal, the pulse generator comprising a memory configured to generate the pulse signal by switching between at least two states, a current source, a capacitor coupled in series with the current source, and a switch having a first terminal coupled between the current source and the capacitor and a second terminal coupled to a reference potential; and a control logic circuit coupled to the control terminal of the first switch, the control logic circuit being configured to receive the pulse signal and control operation of the first switch based on the pulse signal.

12. The power converter of claim 11, further comprising a second switch coupled in series with the first switch and wherein the control logic is further configured to control operation of the first and second switches based on the pulse signal.

13. The power converter of claim 11, wherein the input signal to the ramp generator is a voltage at the first terminal of the inductor and wherein the ramp generator includes a low-pass filter configured to generate the ramp signal by filtering the voltage at the first terminal of the inductor.

14. The power converter of claim 11, wherein the input signal to the ramp generator is a magnitude of current in the inductor and wherein the ramp generator includes an amplifier coupled in series with a sample and hold circuit.

15. The power converter of claim 11, wherein the ramp generator includes a capacitor, a switch coupled in parallel with the capacitor, a voltage source coupled to a first terminal of the capacitor, and a current source coupled to a second terminal of the capacitor.

16. The power converter of claim 15, wherein the input signal to the ramp generator is the pulse signal and wherein the ramp generator is further configured to control operation of the switch coupled in parallel with the capacitor based on the pulse signal.

17. The power converter of claim 11, wherein the pulse generator is further configured to vary a width of the pulse based on the first control signal and the second control signal.

18. A circuit for controlling a power converter including an inductor having a terminal coupled to a supply voltage by a first switch, the circuit comprising:
a detector configured to detect voltage transient events in an output voltage of the power converter and generate a first control signal based on the detected voltage transient events; and
a control signal generator configured to receive the first control signal and control operation of the first switch based on the first control signal at least in part by varying an on-time of the first switch during the voltage transient events and holding the on-time of the first switch constant when no transient event is detected by the detector, the control signal generator comprising a ramp generator configured to generate a ramp signal and including a capacitor, a second switch coupled in parallel with the capacitor, a voltage source coupled to a first terminal of the capacitor, and a current source coupled to a second terminal of the capacitor.

19. The circuit of claim 18, wherein the control signal generator includes a comparator configured to compare the ramp signal with the first control signal to generate a second control signal.

20. The circuit of claim 19, wherein the ramp generator is further configured to generate the ramp signal based on at least one of a magnitude of current in the inductor and a voltage at a terminal of the inductor.

21. The circuit of claim 19, wherein the control signal generator further includes a pulse generator configured to receive the first and second control signals and generate a pulse signal including a pulse based on the first and second control signals and wherein the control signal generator is further configured to control operation of the first switch based on the pulse signal.

22. The circuit of claim 21, wherein the pulse generator is further configured to vary at least one characteristic of the pulse in the pulse signal based on the first and second control signals.

23. The circuit of claim 21, wherein the ramp generator is further configured to receive the pulse signal and generate the ramp signal based on the pulse signal.

* * * * *